United States Patent [19]
Wheelock

[11] Patent Number: 5,433,939
[45] Date of Patent: Jul. 18, 1995

[54] CYCLIC PROCESS FOR OXIDATION OF CALCIUM SULFIDE

[76] Inventor: Thomas D. Wheelock, 437 N. Franklin Ave., Ames, Iowa 50010

[21] Appl. No.: 209,734

[22] Filed: Mar. 14, 1994

[51] Int. Cl.$^6$ .......................... C01F 11/10; C01F 11/08
[52] U.S. Cl. .................................. 423/638; 423/555
[58] Field of Search .............................. 423/638, 555

[56] References Cited

U.S. PATENT DOCUMENTS

| | | | |
|---|---|---|---|
| 2,740,691 | 4/1956 | Burnell | 423/638 |
| 4,102,989 | 7/1978 | Wheelock | 423/638 |
| 4,216,197 | 8/1980 | Moss | 423/638 |
| 4,255,162 | 3/1981 | Moss | 423/638 |

FOREIGN PATENT DOCUMENTS 618307 12/1991 Australia.

OTHER PUBLICATIONS

Article entitled "Clean Coal Technology Demonstration Program" (Program Update 1991), DOE/-FE-0247P, Feb. 1992, U.S. Department of Energy, Assistant Secretary for Fossil Energy, Washington, D.C. 20585.
Article entitled "Sulfation of Partially Sulfided Calcium-Based Sorbents" by J. Abbasian, A. Rehmat and D. D. Banerjee, *Ind. Chem. Res..* 30, 1990–1994 (1991) (No month).
Article entitled "Analysis of the Oxidation Reactions of CaS", *Metallurgical Transactions B*, 11B, 415–425 (1980) Sep.
An article entitled "Intrinsic Kinetics of CaS(s) Oxidation" by R. J. Torres–Ordonez, J. P. Longwell, and A. F. Sarofim, *Energy & Fuels*, 3, 506–515 (1989) no month.
An article entitled "Kinetics of the Oxidation of CaS" by D. C. Lynch and J. F. Elliott, *Metallurgical Transactions B*, 9B, 691–704 (1978) Dec.
An article entitled "Processing Waste Gypsum in a Two–Zone Fluidized Bed Reactor", by C. E. Morris, T. D. Wheelock, and L. L. Smith, in *New Developments in Fluidization and Fluid–Particle Systems*, Wen–ching Yang (ed.), American Institute of Chemical Engineers, New York, 1987, pp. 94–104 (no month).
Article entitled "Cyclic Operation of Fluidized Bed Reactor for Decomposing Calcium Sulfate", *Chemical Engineering Communications*, 109, 155–166 (1991) no month.
Article entitled "Clean Coal Technology Demonstration Program" (Program Update 1991), DOE/-FE-0247P, Feb. 1992, U.S. Department of Energy, Assistant Secretary for Fossil Energy, Washington, D.C. 20585.
Article entitled "Sulfation of Partially Sulfided Calcium–Based Sorbents" by J. Abbasian, A. Rehmat and D. D. Banerjee, Ind. Eng. Chem. Res..
Article entitled "Cyclic Operation of Fluidized Bed Reactor for Decomposing Calcium Sulfate", *Chemical Engineering Communications*, 109, 155–166 (1991) no month.

*Primary Examiner*—Ferris Lander
*Assistant Examiner*—Stuart L. Hendrikson
*Attorney, Agent, or Firm*—Henderson & Sturm

[57] ABSTRACT

A cyclic process of subjecting calcium sulfide particles to alternating oxidizing and reducing conditions. The impenetrable shell of calcium sulfate which forms during the oxidation phase of the cycle is destroyed by the subsequent reducing phase. By repeating the cycle many times the particles are converted completely into calcium oxide at a reasonable temperature of about 1000° C. The process can be carried out in a fluidized bed reactor either by maintaining both oxidizing and reducing zones within the same fluidized bed or by varying the gas phase throughout the fluidized bed in a periodic manner.

4 Claims, 10 Drawing Sheets

Fig. 1 Typical results of thermogravimetric analysis

CYCLIC PROCESS FOR OXIDATION OF CALCIUM SULFIDE

TECHNICAL FIELD

This invention relates to chemical processes, and more particularly to a process for oxidizing calcium sulfide.

BACKGROUND ART

The numbers in brackets below refer to references listed in the Appendix, the teachings of which are hereby incorporated by reference.

Several large-scale demonstration projects supported by the U.S. Department of Energy (DOE) will generate coal gasifier solid waste containing calcium sulfide [1]. These projects involve integrated coal gasification, combined-cycle (IGCC) systems for generating electric power more efficiently than can be accomplished with present systems. Cooperative agreements have been reached with industry for undertaking these projects and preliminary design of the systems is underway. The systems are expected to be in operation soon. Successful demonstration of the IGCC concept could lead to the wide scale adoption of this technology for new power plants.

An important aspect of the IGCC concept is the use of lime to capture 90% of the sulfur produced during gasification of the coal. However, the waste calcium sulfide which is generated cannot be placed directly in a landfill where it would react slowly with moisture to release toxic hydrogen sulfide gas. Therefore, it has been proposed to oxidize the calcium sulfide to calcium sulfate for disposal, but the oxidation of calcium sulfide to calcium sulfate is not a straightforward operation. An earlier attempt to oxidize solid particles of calcium sulfide at temperatures ranging from 650° to 980° C. by using an oxygen partial pressure of 0.06 atm resulted in only partial conversion of the calcium sulfide [2]. It appeared that under these conditions an impenetrable shell of calcium sulfate formed around each particle stopping the reaction and leaving an unreacted core of calcium sulfide. To circumvent this problem it has been proposed to use dolomitic lime and only partial sulfidation of the material, but of course, much more lime will be required and much more waste will be generated than would be the case were the lime completely sulfided.

An alternative approach is to oxidize calcium sulfide to calcium oxide and sulfur dioxide. The calcium oxide can be recycled which greatly reduces the waste disposal problem, and the sulfur dioxide can be converted into sulfuric acid or elemental sulfur by well-known methods. However, the oxidation of calcium sulfide to calcium oxide is also difficult. Previous work [3,4] showed that the oxidation of calcium sulfide with oxygen containing mixtures at temperatures in the range of 1000° to 1350° C. produced both calcium sulfate and calcium oxide. Only when oxidation was conducted at 1450° to 1550° C. was it possible to achieve a high conversion of calcium sulfide to calcium oxide in a reasonable time [5]. Unfortunately, such temperatures are not achieved easily, and the lime would probably be dead burned and unreactive so that it could not be recycled.

Those concerned with these and other problems recognize the need for an improved process for oxidizing calcium sulfide.

DISCLOSURE OF THE INVENTION

The present invention provides a cyclic process of subjecting calcium sulfide particles to alternating oxidizing and reducing conditions. The impenetrable shell of calcium sulfate which forms during the oxidation phase of the cycle is destroyed by the subsequent reducing phase. By repeating the cycle many times the particles are converted completely into calcium oxide at a reasonable temperature of about 1000° C. The process can be carried out in a fluidized bed reactor either by maintaining both oxidizing and reducing zones within the same fluidized bed or by varying the gas phase throughout the fluidized bed in a periodic manner.

An object of the present invention is the provision of an improved process for oxidizing calcium oxide.

For conducting this process in a two-zone fluidized bed, typically air is introduced in one zone to create an oxidizing environment, and a reducing gas such as natural gas is introduced in a second zone to create a reducing environment. Usually one zone will be located above the other although other arrangements are possible. In one embodiment of this invention air is supplied through a gas distributor at the bottom of the fluidized bed to create an oxidizing zone in the lower part of the bed. A reducing gas is introduced through a second distribution grid located in the mid-region of the bed to create a reducing zone in the upper part of the bed. Alternatively, the zones can be reversed by introducing a reducing gas through the lower distributor and an oxidizing gas through the upper distributor. The upper gas distributor is in the form of an open grid of tubing which does not interfere with particle circulation in the fluidized bed. As the particles circulate within the bed they pass through the different zones and are alternately oxidizing and reduced.

In a second embodiment of this invention air and a reducing gas are supplied alternately to a fluidized bed of reacting particles so that the gas composition of the entire bed varies periodically. Consequently, during one phase of each cycle all of the particles are subjected to oxidation and during another phase all the particles are subjected to reduction.

With either method when the particles containing calcium sulfide are exposed to air at high temperature the following reactions will occur:

$$CaS + \frac{3}{2} O_2 = CaO + SO_2 \qquad (1)$$

Based on experimental evidence presented in Example I below, reaction 2 is the dominant reaction for temperatures up to 1150° C. Both of these reactions are highly exothermic. When the particles are subjected subsequently to a reducing gas such as carbon monoxide, the reactions shown below will take place:

$$CaSO_4 + CO = CaO + CO_2 + SO_2 \qquad (3)$$

$$CaSO_4 + 4CO = CaS + 4CO_2 \qquad (4)$$

Reaction 3 is moderately endothermic, whereas reaction 4 is moderately exothermic. For low and moderate concentrations of carbon monoxide, reaction 3 is the dominant reaction. However, reaction 4 can play a significant role if the concentration of reducing gas is very large. Therefore, the concentration of reducing gas must be controlled within limits to avoid excessive reformation of calcium sulfide. Fortunately, the formation of a small amount of calcium sulfide during the reducing phase of one cycle will not be harmful since the calcium sulfide will be destroyed during the oxidizing phase of the next cycle. It is only when a large fraction of the calcium sulfate is converted to calcium sulfide that the overall conversion to calcium oxide is restricted.

Under process conditions which cause reaction 2 to be the dominant reaction during oxidation and reaction 3 to be the dominant reaction during reduction, the calcium sulfide particles will appear to undergo an overall reaction which is the sum of these two reactions. The overall reaction is shown below:

$$CaS + 2O_2 + CO = CaO + CO_2 + SO_2 \qquad (5)$$

In accordance with this reaction, the conversion of each mole of calcium sulfide to calcium oxide requires two moles of oxygen and one mole of carbon monoxide. Since reaction 5 is exothermic, some means is required for removing the excess heat of reaction from the system. A practical method for removing the heat is to spray water into the fluidized bed. The conversion of water into superheated steam absorbs a relatively large quantity of heat per unit mass and does not interfere with the chemical reactions.

Other reducing gases such as hydrogen, natural gas, or coal producer gas can also be utilized in the reductive decomposition step of the overall process for converting calcium sulfide to calcium oxide. Thus, when hydrogen is utilized for the reductive decomposition step, the following reactions can take place:

$$CaSO_4 + H_2 = CaO + H_2O + SO_2 \qquad (6)$$

$$CaSO_4 + 4H_2 = CaS + 4H_2O \qquad (7)$$

The sum of reactions 2 and 6 yields the overall exothermic reaction shown below for converting calcium sulfide to calcium oxide:

$$CaS + 2O_2 + H_2 = CaO + H_2O + SO_2 \qquad (8)$$

When methane, which is the principal component of natural gas, is used for the reductive decomposition step, the following reactions can occur:

$$CaSO_4 + \tfrac{1}{4} CH_4 = CaO + \tfrac{1}{4} CO_2 + \tfrac{1}{2} H_2O + SO_2 \qquad (9)$$

The sum of reactions 2 and 9 yields the overall exothermic reaction shown below for converting calcium sulfide to calcium oxide:

$$CaS + 2O_2 + \tfrac{1}{4} CH_4 = CaO + \tfrac{1}{4} CO_2 + \tfrac{1}{2} H_2O + SO_2 \qquad (11)$$

From the preceding discussion it can be seen that the conversion of calcium sulfide to calcium oxide can be regarded as a two-step process in which the calcium sulfide is first oxidized to calcium sulfate and then calcium sulfate is reduced to calcium oxide. The first step requires two moles of oxygen gas for each mole of calcium sulfide while the second step requires an amount of reductant determined by the stoichiometry of the second step. Thus, for the reduction of one mole of calcium sulfate the following quantities of various reduction agents are required: 1 mole CO or $H_2$, 0.25 mole $CH_4$, 0.143 mole $C_2H_6$, or 0.100 mole $C_3H_8$.

Methods similar to the ones described above for conducting a cyclic process have been demonstrated with large bench-scale reactors applied to the decomposition of calcium sulfate [6, 7, 8, 9]. Since this is an endothermic process, heat is supplied by partial combustion of a hydrocarbon fuel such as natural gas within the fluidized bed where calcium sulfate is decomposed. Partial combustion of a fuel-rich mixture of fuel and air generates carbon monoxide and hydrogen which then react with calcium sulfate mainly according to reactions 3 and 6. However, some calcium sulfate is reduced to calcium sulfide by reactions 4 and 7.

In order to eliminate the calcium sulfide produced by these reactions, the particles are treated subsequently with an oxidizing gas which results in reactions 1 and 2 taking place. However, reaction 2 produces calcium sulfate which can only be decomposed by further exposure to a reducing gas. Thus, it has proved effective to employ a cyclic process in which the particles are treated alternately and repeatedly to oxidation and reduction. One method of conducting the cyclic process is to establish separate oxidizing and reducing zones within the same fluidized bed by controlling the air to fuel ratio supplied to the different zones. For example, a fuel-rich mixture of air and natural gas is supplied to the bottom of the bed creating a reducing zone in the lower part of the bed, and excess secondary air is supplied higher up in the bed creating an oxidizing zone in the upper part of the bed. A second method of conducting the cyclic process involves varying in a periodic manner the composition of the entire gas phase within the bed by controlling the overall air to fuel ratio supplied to the reactor. During one part of each cycle a fuel-rich mixture of air and natural gas is supplied to the reactor, while during another part of the cycle only air is supplied.

Although the present methods for converting calcium sulfide to calcium oxide appear similar to the methods which were demonstrated previously for converting calcium sulfate to calcium oxide, the two processes serve entirely different purposes and differ in implementation. The conversion of calcium sulfide to calcium oxide is a two step process which has to be conducted by means of a series of short oxidation and reduction steps. Calcium sulfate is an unavoidable intermediate formed by the first step and destroyed by the second step. Since the overall conversion of calcium sulfide to calcium oxide is an exothermic process, heat has to be removed by some means such as by spraying water into the fluidized bed or by cooling the reactor walls. The overall required amounts of oxygen and reducing gas are determined by the stoichiometric requirements of reactions such as 5, 8, and 11.

The previously developed cyclic process, which is designed for converting calcium sulfate into calcium oxide, is a one step process. The formation of calcium sulfide is incidental. Calcium sulfide is formed by a side reaction and is never present in more than small amounts. The oxidation step in the cycle serves the purpose of eliminating this undesirable by-product. Since the conversion of calcium sulfate into calcium oxide is an endothermic process, heat has to be supplied by the combustion of fuel within the fluidized bed. The fuel requirements for the reductive decomposition of calcium sulfate via reactions such as 3, 6, and 9 are relatively large both because of the heat absorbed by the reactions and the participation of reducing gases in the reactions. Previous material and energy balance calculations have shown that if methane is employed as a fuel and source of reductants, between 0.65 and 1.66 mole $CH_4$/mole $CaSO_4$ is required depending on the reaction temperature and thermal efficiency of the process [6]. The quantity of methane is much greater than the 0.25 mole $CH_4$/mole CaS required for the conversion of calcium sulfide to calcium oxide by the present two step process. Air requirements for the two processes also differ substantially. Therefore, it can be seen that the two processes require conditions which differ significantly.

BRIEF DESCRIPTION OF THE DRAWINGS

These and other attributes of the invention will become clearer upon a thorough study of the following description of the best mode for carrying out the invention, particularly when reviewed in conjunction with the examples and drawings wherein.

BEST MODE FOR CARRYING OUT THE INVENTION

The following examples are illustrative of the best mode for carrying out the invention. They are obviously not to be construed as limitative of the invention since various other embodiments can readily be evolved in view of the teachings provided herein.

EXAMPLE I

Methods of converting calcium sulfide to either calcium oxide or calcium sulfate using different techniques were investigated since these two products are much more suitable for direct disposal.

The oxidation of calcium sulfide was done using a Thermogravimetric Analysis apparatus (TGA).

Among the different techniques used, the most promising was a series of experiments involving the cyclic oxidation and reduction of pure calcium sulfide pellets in the TGA apparatus. A pellet was placed in a basket and put into the TGA apparatus.

The TGA apparatus consisted of a quartz reactor tube about 1 meter in length surrounded by an insulated electric furnace which could heat up to about 1200° C.

A CAHN 2000 electrobalance was used to give continuous readings of the mass of the sample during experiments. These readings were recorded on a chart recorder. The samples were placed in either a quartz basket or on a quartz pan and were hung from a loop on the electrobalance.

The gases were fed into the top of the quartz tube and also some nitrogen was fed into the electrobalance casing to stop any other gases from entering it. The gas mixture was regulated using a series of rotameters.

The temperature in the furnace was regulated manually using a thermocouple to measure reactor temperature, and it was possible to keep the temperature within 10° C. of the desired temperature.

The electrobalance was calibrated every 3 or 4 experiments or whenever the sample holder was changed or replaced.

For the oxidation phase of the cycle 10% oxygen was used for most experiments. For the reduction phase of the cycle either 20% natural gas or 5% carbon monoxide was used. The time for oxidation and reduction varied from one minute for each phase to a longer time where the oxidation and reduction were allowed to go to completion.

The other variable for these experiments was the temperature and this ranged from 900° to 1100° C.

Due to the fact that the exit gas stream could not be analyzed, the final composition of the sample was not known and therefore a few reacted and partially reacted samples were sent for X-ray diffraction analysis.

Figure 1:
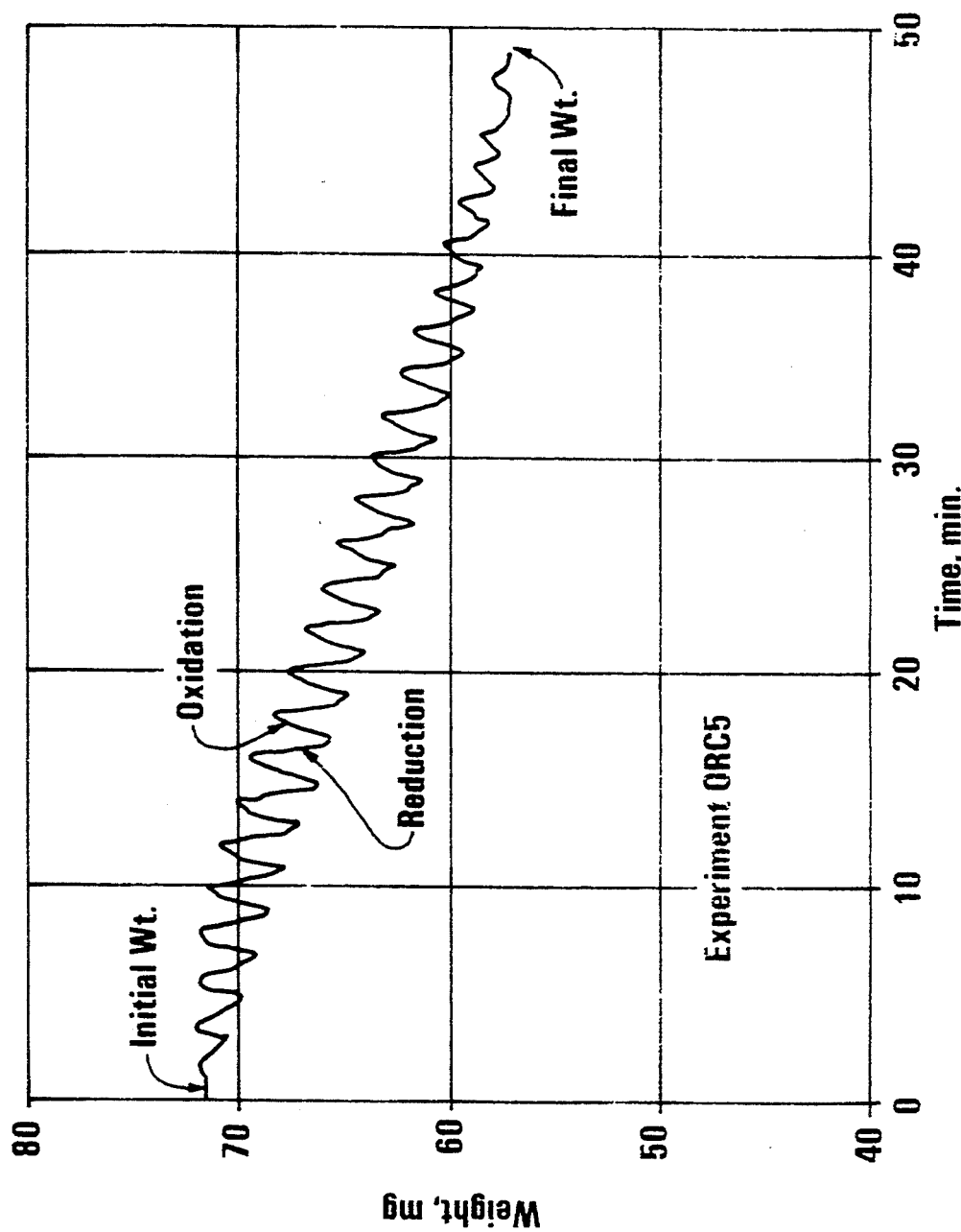
FIG. 1 is a chart from the chart recorder connected to a Thermogravimetric Analysis (TGA) apparatus showing sample weight changes which occurred during the oxidation of CaS by the cyclic process.

FIG. 1 shows a typical result achieved using this method.

The set of experimental data given in TABLE 1 shows different operating conditions and results. In these experiments the aim was to convert the sulfide to the oxide. The results show that the conversion was quicker at higher temperatures but that the conversion obtained varied fairly widely.

TABLE 1

Cyclic oxidation of CaS Pellets using 10% oxygen and 20% natural gas or 5% carbon monoxide

| EXPERIMENT No. | TEMPERATURE C. | INITIAL Wt. mg | FINAL. Wt. mg | WEIGHT LOSS mg. | TIME mins. | CONVERSION % | CYCLE RATIO Oxid. min/Red. min |
|---|---|---|---|---|---|---|---|
| CYCLIC OXIDATION AND REDUCTION USING OXYGEN AND NATURAL GAS ||||||||
| ORM 1 | 1050 | 92 | 71 | 21 | 116 | 100 | 5:1 |
| ORM 2 | 950 | 76 | 60 | 16 | 135 | 93 | 1:1 |
| ORM 3 | 1050 | 81 | 66 | 15 | 72 | 81 | 1:1 |
| ORM 4 | 1100 | 91 | 72 | 19 | 60 | 92 | 1:1 |
| ORM 5 | 1050 | 67 | 54 | 13 | 76 | 87 | 1:1 |
| ORM 6* | 1050 | 74 | 60 | 14 | 74 | 86 | 1:1 |
| ORM 7 | 1050 | 68 | 52 | 16 | 64 | 103 | 2:1 |
| ORM 8 | 1050 | 82 | 66 | 16 | 100 | 86 | 2:1 |
| ORM 9 | 1100 | 70 | 57 | 13 | 40 | 81 | 1:1 |
| CYCLIC OXIDATION AND REDUCTION USING OXYGEN AND CARBON MONOXIDE ||||||||
| ORC 1 | 1050 | 70 | 57 | 13 | 60 | 81 | 1:1 |
| ORC 2 | 1050 | 67 | 57 | 10 | 44 | 67 | 1:1 |
| ORC 3 | 950 | 64 | 54 | 10 | 80 | 71 | 1:1 |
| ORC 4 | 1050 | 69 | 56 | 13 | 56 | 83 | 1:1 |
| ORC 5 | 1100 | 72 | 56 | 16 | 44 | 97 | 1:1 |
| ORC 6 | 1050 | 70 | 57 | 13 | 78 | 81 | 2:1 |
| ORC 7 | 1100 | 65 | 50 | 15 | 72 | 102 | VARIED |
| ORC 8 | 1050 | 60 | 47 | 13 | 104 | 100 | 4:4 |
| ORC 9 | 900 | 97 | 84 | 13 | 160 | 62 | VARIED |
| ORC 10 | 950 | 56 | 49 | 7 | 220 | 58 | VARIED |
| ORC 11 | 1050 | 62 | 49 | 13 | 160 | 93 | VARIED |

*20% oxygen was used for experiment ORM 6.

The solids recovered following experiments ORC 5 and ORM 3 in which calcium sulfide had undergone cyclic oxidation and reduction were subjected to X-ray diffraction analysis. This analysis confirmed the almost complete oxidation of calcium sulfide to calcium oxide. While the product contained a large amount of calcium hydroxide when analyzed, the calcium hydroxide was the result of exposing the material to air before it was analyzed. Consequently the calcium oxide reacted with moisture in the air to form calcium hydroxide. Therefore, the analysis showed the product of experiment ORC 5 to be essentially all calcium hydroxide and the product of experiment ORM 3 to be largely calcium oxide with a considerable amount of calcium hydroxide and a small amount of calcium sulfide.

By reference to Table 1, it can be seen that particles or pellets of calcium sulfide can be converted rapidly and almost completely to calcium oxide by a cyclic process which exposes the material alternatively to oxidation and reduction at 900° to 1100° C. In experiment number ORC 5, during the oxidation phase of the cycle, the particles were treated with a gas mixture containing 10% by volume oxygen and during the reducing phase the particles were treated with a gas containing 5% by volume carbon monoxide. By using a 2 minute cycle and a total treatment time of 44 minutes, a conversion of 97% was achieved at 1100° C. starting with a 72 mg pellet and using conventional TGA equipment. When a similar pellet of calcium sulfide was subjected to oxidation alone under similar conditions, almost no reaction took place.

The results of such experiments indicate that during the oxidation phase of the cycle the principal reaction taking place is the following:

$$CaS + O_2 = CaSO_4 \qquad (1)$$

Since the calcium sulfate occupies a greater volume than the calcium oxide, it blocks the pores in the particle and forms an impenetrable layer. When the particle is subsequently treated with a reducing gas such as carbon monoxide, the following reaction occurs:

$$CaSO_4 + CO = CaO + CO_2 + SO_2 \qquad (2)$$

These reactions can be observed by measuring the change in weight of the particle, since the first reaction produces an increase in weight, whereas the second reaction produces a decrease in weight. For each cycle there is an overall decrease in weight, and these changes become readily apparent by employing thermogravimetric analysis (TGA). Preliminary experiments indicate that a number of cycles are required to convert a particle of calcium sulfide completely to calcium oxide. The evidence suggests that the conversion of calcium sulfide into calcium oxide follows a shrinking, unreacted core process where the unreacted core of calcium sulfide gradually recedes and the surrounding shell of calcium oxide gradually becomes thicker with each cycle.

EXAMPLE II

Further experiments were conducted with the TGA apparatus described above to determine the effects of gas composition and temperature on the overall rate of conversion of calcium sulfide to calcium oxide by the cyclic oxidation and reduction process. Again single pellets of pure calcium sulfide were treated in the apparatus to oxidizing and reducing gas mixtures under carefully controlled conditions, and the progress of the reactions was observed by recording the weight of the pellet continuously. A 2 min. cycle time was employed with 1 min. devoted to oxidation and 1 min. to reduction. Temperature, oxygen concentration, and the type of reducing gas and its concentration were varied among different runs. The conversion of calcium sulfide to calcium oxide was determined throughout each run from the loss in weight of the reacting pellet. The results of this series of runs are reproduced in FIGS. 2 to 6. In each of these figures the conversion is plotted against reaction time. Therefore, the slope of the resulting curve is a measure of the overall rate of conversion.

Figure 2:
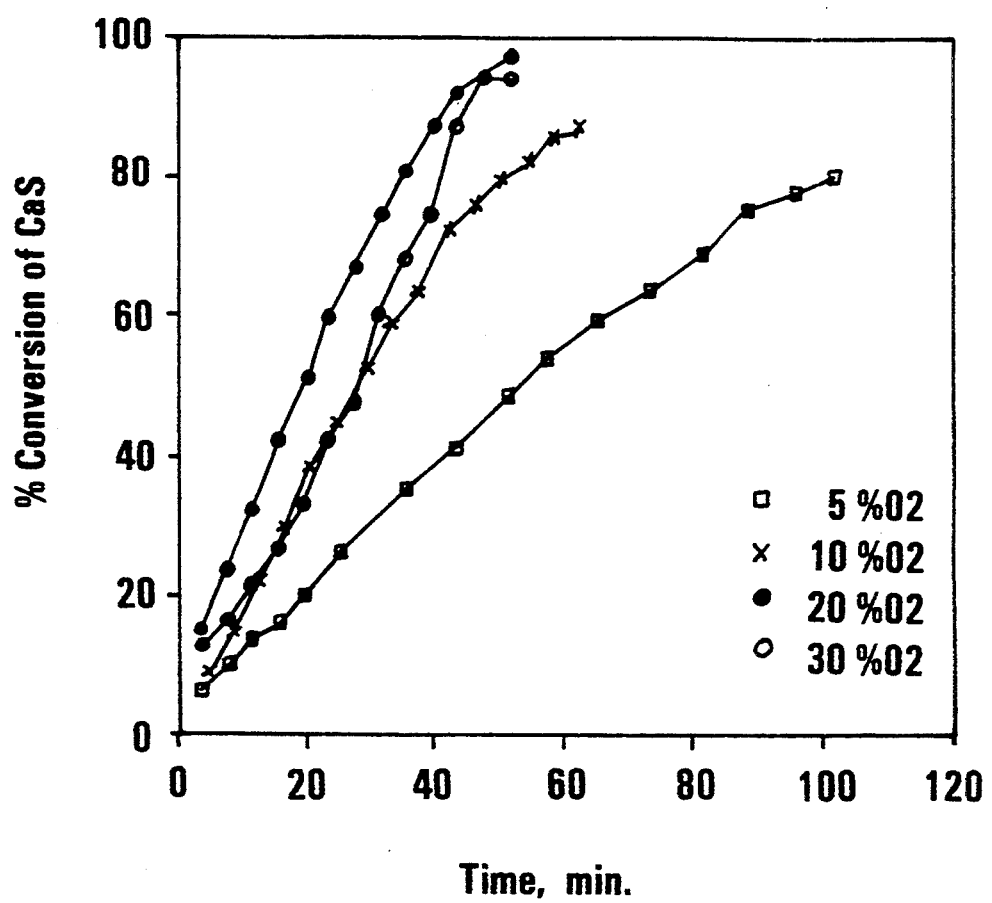
FIG. 2 is a graph of the data obtained in a series of TGA runs in which a pellet of calcium sulfide was treated by the cyclic process at 1050° C. using various oxygen concentrations and a carbon monoxide concentration of 30 mole %.

To investigate the effect of gas composition on the rate of conversion, a reaction temperature of 1050° C. was employed. FIG. 2 shows how the overall rate of conversion of calcium sulfide was affected by oxygen concentration during the oxidizing phase of each cycle. Carbon monoxide in 30 mole % concentration was the reducing gas employed during the reducing phase. It can be seen that the greatest overall rate of conversion was achieved with 20 mole % oxygen. With either higher or lower oxygen concentrations, the overall rate of conversion was lower.

Figure 3:
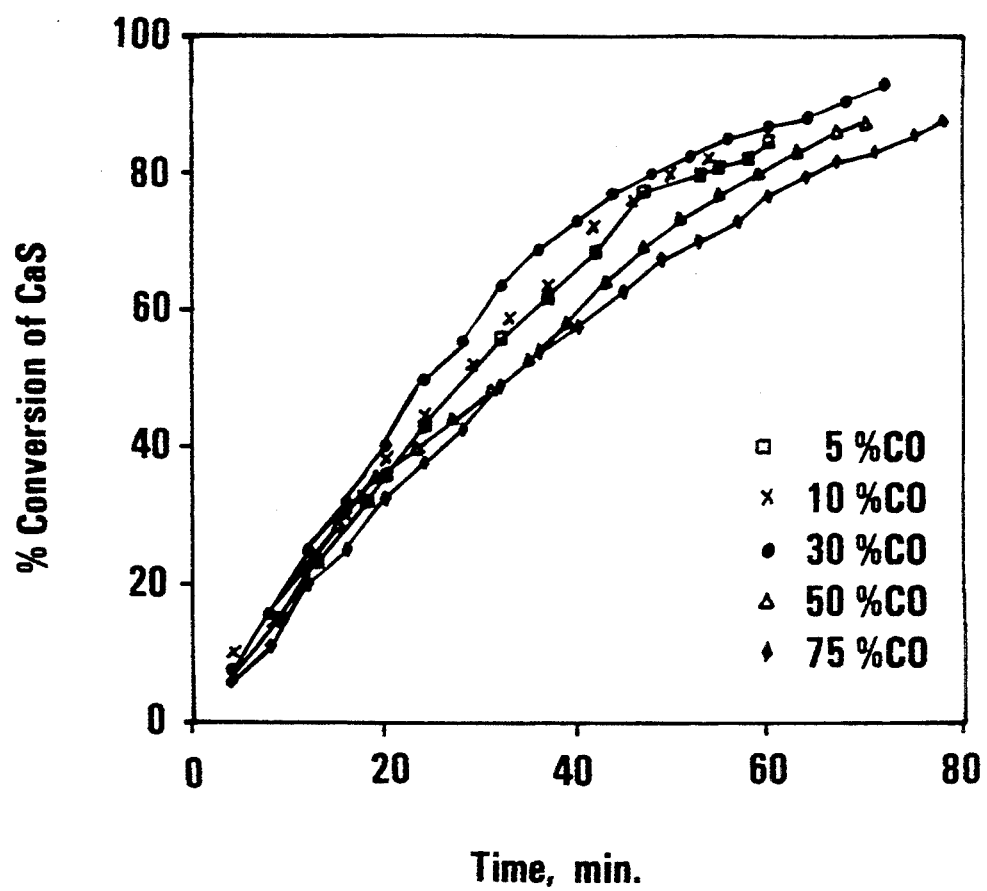
FIG. 3 is a graph of the data obtained in a series of TGA runs in which a pellet of calcium sulfide was treated by the cyclic process at 1050° C. using an oxygen concentration of 10 mole % and various carbon monoxide concentrations.
Figure 4:
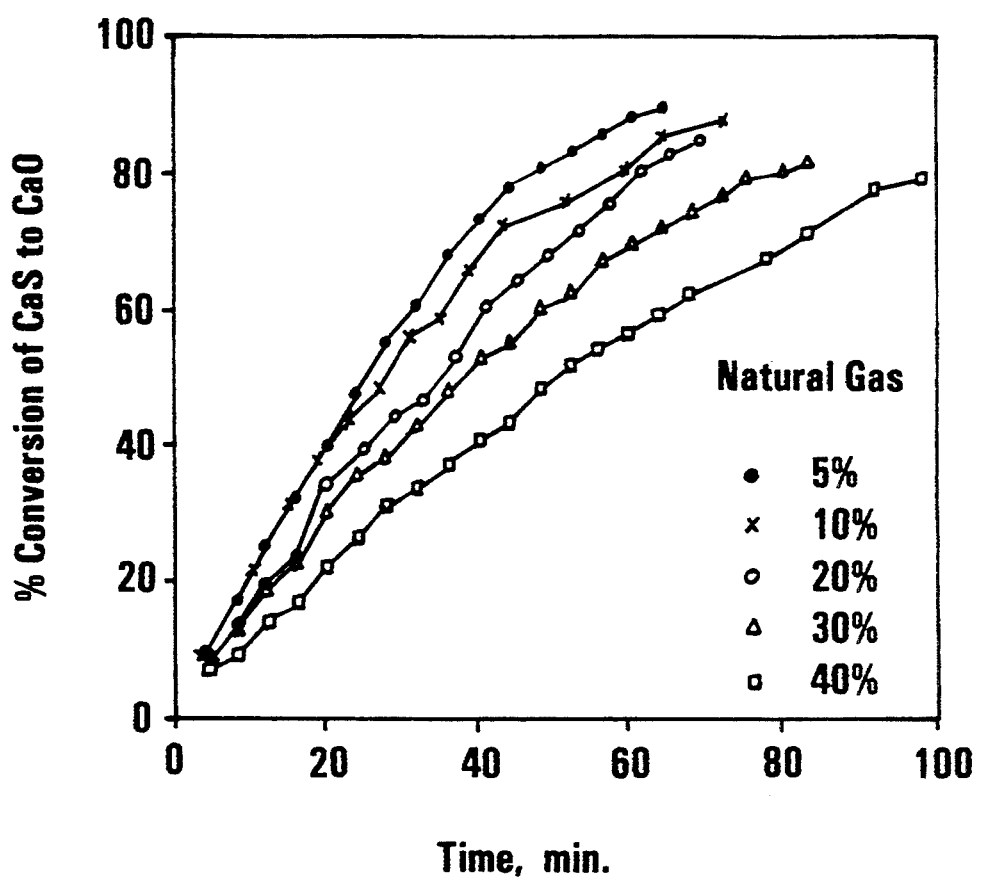
FIG. 4 is a graph of the data obtained in a series of TGA runs in which a pellet of calcium sulfide was treated by the cyclic process at 1050° C. using an oxygen concentration of 10 mole % and various concentrations of natural gas.
Figure 5:
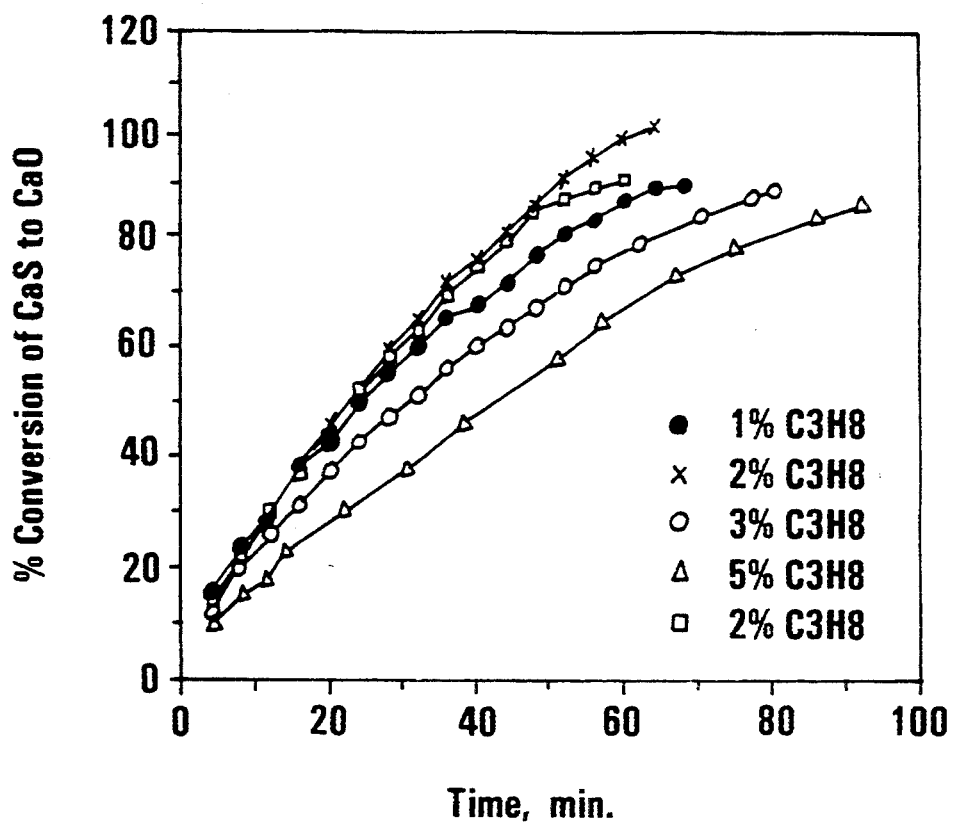
FIG. 5 is a graph of the data obtained in a series of TGA runs in which a pellet of calcium sulfide was treated by the cyclic process at 1050° C. using an oxygen concentration of 10 mole % and various concentrations of propane.

To investigate the effects of reducing gas type and concentration, an oxygen concentration of 10 mole % was employed during the oxidizing phase. The results achieved with carbon monoxide, natural gas, and propane as individual reducing agents are shown in FIGS. 3, 4, and 5, respectively. These results indicate that the maximum rate of conversion was observed when the individual reducing agents were used in the following concentrations: 30 mole % carbon monoxide, 5 mole % natural gas, and 2 mole % propane. These concentrations are in general agreement with the stoichiometric amount of reductant required for the conversion of calcium sulfate into calcium oxide. The most likely explanation for the lower rate of conversion observed when the reducing gas concentration was either smaller or larger than the optimum value is the following: for concentrations less than the optimum value, the rate of conversion of calcium sulfate to calcium oxide was proportional to reactant gas concentration which is normal. For concentrations greater than the optimum value, the rate of conversion of calcium sulfate to calcium oxide was depressed by the simultaneous conversion of part of the calcium sulfate to calcium sulfide.

Figure 6:
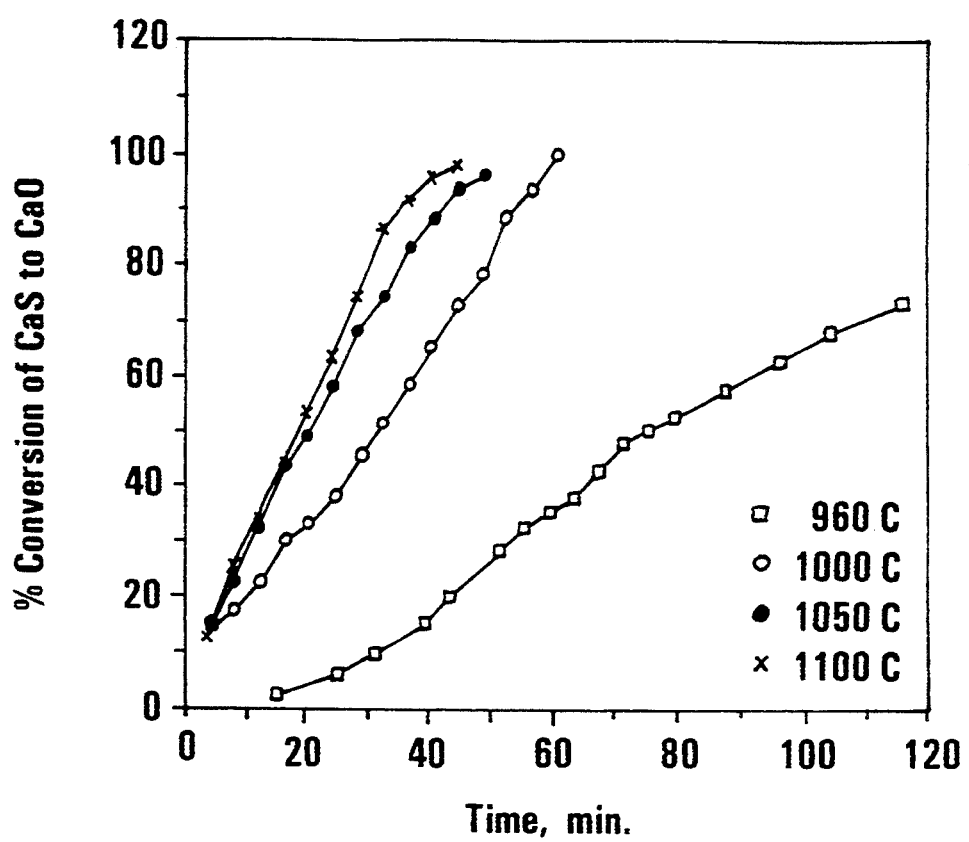
FIG. 6 is a graph of the data obtained in a series of TGA runs in which a pellet of calcium sulfide was treated by the cyclic process with 20 mole % oxygen and 30 mole % carbon monoxide at various temperatures.

For investigating the effect of reaction temperature on the rate of conversion, an oxygen concentration of 20 mole % was employed during the oxidizing phase and a carbon monoxide concentration of 30 mole % was employed during the reducing phase of each cycle. The results of a series of runs made at different temperatures are indicated by FIG. 6. It can be seen that the overall rate of conversion increased with increasing temperature over the range of temperature explored, i.e., from 960° to 1100° C. However, the increase in the rate of reaction between 1050° and 1100° C. was very slight.

EXAMPLE III

Figure 7:
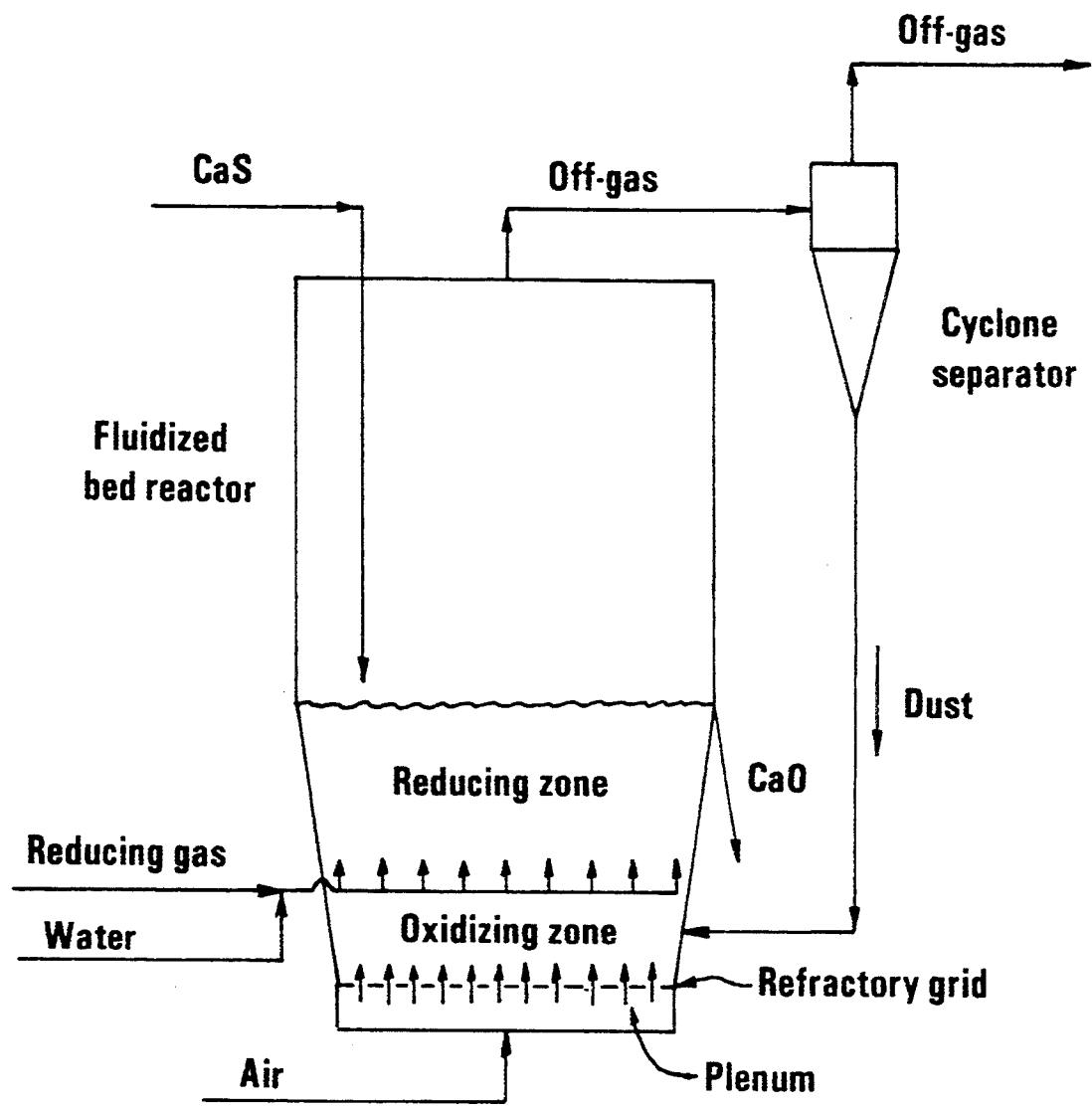
FIG. 7 is a cross-sectional elevational view of a fluidized bed reactor equipped with means for concurrently maintaining a reducing zone above an oxidizing zone within the same fluidized bed.

In a typical industrial application of the two-zone fluidized bed process of this invention, calcium sulfide particles are converted to calcium oxide particles continuously in a two-zone fluidized bed supplied with air and natural gas and heated to 1000° C. The process is carried out in a reaction system such as portrayed by FIG. 7. Air is introduced through a refractory grid plate at the bottom of the fluidized bed, creating an oxidizing zone in the lower part of the bed. Natural gas is introduced through a second gas distributor which is located in the mid-region of the fluidized bed, creating a reducing zone in the upper part of the bed. Since the natural gas is diluted immediately upon entering the fluidized bed, the reacting particles will not be exposed to excessively high concentrations of reducing gas which can reform calcium sulfide. Because the oxidation of calcium sulfide generates a large amount of heat, water is introduced directly into the fluidized bed to remove part of the heat. Some of the heat is also removed by the endothermic reduction of calcium sulfate to calcium oxide and by heating the various reactants from ambient temperature to the temperature of the fluidized bed. Although water can be introduced almost anywhere in the fluidized bed for the purpose of cooling, it is introduced advantageously through the same distributor used for introducing the reducing gas. In this way a gas distributor made of metal pipe or tubing (e.g., type 446 stainless steel) is employed because its temperature is maintained well below the temperature of the fluidized bed due to the cooling provided by the water as it is heated and converted into steam. Otherwise without the cooling effect of the water, it would be necessary to introduce the reducing gas through a distributor made of refractory materials which can withstand the corrosive effects of the hot sulfurous gases present in the fluidized bed. These gases are especially corrosive at higher temperatures. Needless to say a gas distributor made of a refractory material would be much more cumbersome and costly to construct than one made of metal tubing. The gas distributor constructed from metal tubing is in the form of an open grid which does not interfere with particle circulation in the fluidized bed. The calcium sulfide particles are introduced directly into the fluidized bed as indicated in FIG. 7 or alternately into the reactor off-gas stream between the reactor and cyclone separator. If the latter method is employed, the particles are recovered by the cyclone along with dust entrained in reactor off-gas and returned to the reactor. By introducing the particles into the off-gas, some heat is recovered from the off-gas which increases the overall thermal efficiency of the process. Also the particles are subjected to less thermal shock than when they are introduced directly into the fluidized bed. Therefore, particle decrepitation is reduced. While the particles reside in the fluidized bed, they circulate freely between the two zones and are subjected alternately and repeatedly to oxidation and reduction which over time converts them to calcium oxide. The reacted particles are removed subsequently and continuously through an overflow tube.

The walls of the reactor are tapered as indicated in FIG. 7 so that the superficial gas velocity is nearly constant between the top and bottom of the fluidized bed. This design promotes smoother fluidization than one which causes the gas velocity to vary greatly between the top and bottom. Inevitably some of the finer particles are elutriated from the fluidized bed and entrained in the off-gas. The freeboard between the top of the fluidized bed and the top of the reactor vessel is designed by well known methods, to minimize particle entrainment in the off-gas. Most of the particles remaining in the off-gas are recovered by the cyclone separator and returned to the reactor.

In operation the reactants are supplied to the fluidized bed in proportions which promote reaction 2 in the oxidizing zone and reactions such as reaction 9 in the reducing zone so that the overall process takes place in accordance with a reaction such as reaction 11. For purposes of illustration it is assumed that natural gas consists largely of methane. Therefore, under ideal conditions 2 moles of oxygen and 0.25 mole of methane are required for the reaction of each mole of calcium sulfide. Consequently, 9.52 moles of air and 0.25 mole methane are supplied to the reactor for each mole of calcium sulfide.

Since reaction 11 generates more heat than is required to maintain a reaction temperature of 1000° C. or more, cooling water is introduced into the fluidized bed. The quantity of cooling water is estimated by simultaneous solution of the material and energy balances for the reaction system. Such an estimate was made based on the following assumptions: reactants and cooling water supplied at 25° C., natural gas consisting of 90 mole % $CH_4$ and 10 mole % $N_2$ utilized, reaction temperature of 1025° C. negligible heat losses, reactants supplied in stoichiometric proportions, feed particles introduced directly into the fluidized bed, and complete conversion of calcium sulfide to calcium oxide. For these conditions, 4.05 moles of cooling water are required for each mole of calcium sulfide reacted. Consequently, for each mole of calcium sulfide reacted, the following quantities of gaseous products are produced:

|  | moles | mole % |
|---|---|---|
| $SO_2$ | 1.00 | 7.5 |
| $CO_2$ | 0.25 | 1.9 |
| $H_2O$ | 4.55 | 34.0 |
| $N_2$ | 7.55 | 56.6 |
|  | 13.35 | 100.0 |

These results show that the off-gas will contain 7.5 mole. % sulfur dioxide which is equivalent to 11.4 mole % on a dry basis. A concentration of this magnitude is suitable for subsequent conversion of sulfur dioxide into sulfuric acid by known methods.

Since the gases leave the fluidized bed reactor at a temperature of 1000° C. or more, they contain sensible heat which can be recovered advantageously by employing a waste heat boiler which generates steam. The steam can be used either for industrial process heating or power generation.

The quicklime produced by this process is virtually free of calcium sulfide and is suitable for various purposes such as the adsorption of sulfurous gases in either coal gasifiers or flue gas desulfurization systems, the stabilization of soils used for road bases, and the production of cement clinker.

EXAMPLE IV

When producer gas made from coal or coke is used in the two-zone fluidized bed process of this invention, only slight modification of the conditions described in Example III is necessary. Based on a typical producer gas consisting of 25.3 mole % CO, 13.2 mole % $H_2$, 5.4 mole % $CO_2$, and 56.1 mole % $N_2$, the simultaneous solution of the material and energy balances around the reaction system shows that for the conversion of one mole of calcium sulfide to calcium oxide at 1025° C. under ideal conditions the following quantities are required: 9.54 moles air, 2.60 moles producer gas, and 4.17 moles cooling water. For each mole of calcium sulfide reacted, the following quantities of gaseous products are produced:

|  | moles | mole % |
|---|---|---|
| $SO_2$ | 1.00 | 6.6 |
| $CO_2$ | 0.66 | 4.4 |
| $H_2O$ | 4.51 | 29.8 |
| $N_2$ | 8.96 | 59.2 |
|  | 15.13 | 100.0 |

These results indicate that the off-gas contains 6 6 mole % sulfur dioxide which is equivalent to 9.4 mole % on a dry basis. While the concentration of sulfur dioxide is slightly lower than noted in Example III, the concentration is still adequate for conversion of sulfur dioxide into sulfuric acid. The quicklime is similar to that produced under the conditions of Example III, and heat can be recovered from the off-gas by employing a waste heat boiler to generate steam.

EXAMPLE V

Figure 8:
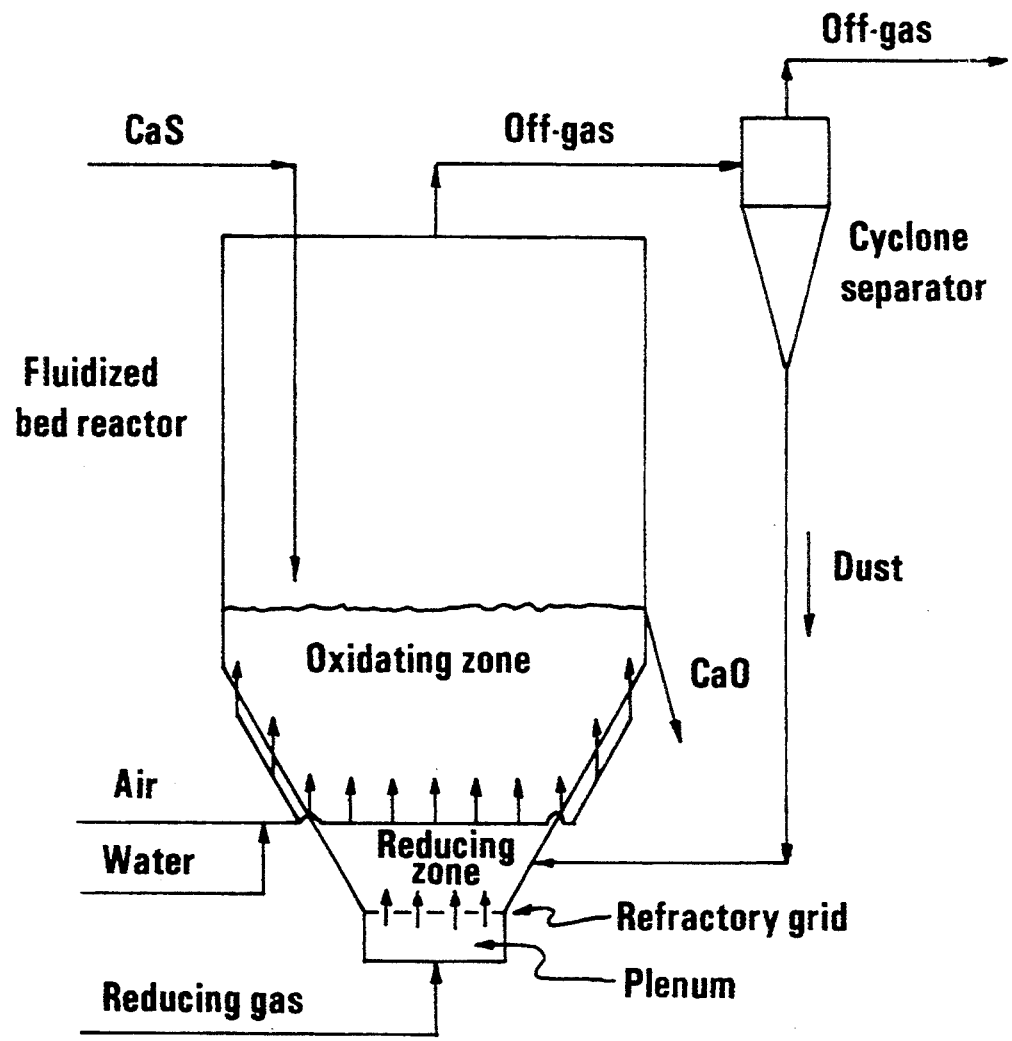
FIG. 8 is a cross-sectional elevational view of a fluidized bed reactor equipped with means for concurrently maintaining an oxidizing zone above a reducing zone within the same fluidized bed.

When a less concentrated reducing agent such as producer gas is available for use in the two-zone fluidized bed process of this invention, an alternative method of practicing the invention is to interchange the oxidizing and reducing zones so that the oxidizing zone is above the reducing zone as indicated in FIG. 8. In this case the reducing gas is introduced through the refractory grid at the bottom of the fluidized bed, and air is introduced at a higher level in the bed through a second gas distributor and also through ports or nozzles located in the sloping sides of the vessel which contains the fluidized bed. Since the volumetric flow rate of the reducing gas is much less than the volumetric flow rate of the oxidizing gas, maintaining a constant superficial gas velocity within the fluidized bed requires that the diameter of the bottom of the bed be much smaller than the diameter of the top of the bed. This requirement is met by sloping the slides of the vessel at an angle of 45° to 60° with the horizontal. To maintain bed fluidization in the region above the sloping sides, air is introduced through ports or nozzles located along the sloping sides. Cooling water is introduced along with air through the upper gas distribution grid within the fluidized bed for the purpose of cooling both the bed and the distributor.

Calcium sulfide particles are introduced into and removed from the fluidized bed as in the previous examples. Also the off-gas is treated in a cyclone separator as before to remove entrained dust.

Interchanging the location of the oxidizing and reducing zones does not affect the material and energy balances for an ideal reaction system as represented by FIGS. 7 and 8. Therefore, when a producer gas and operating conditions such as those described in Example IV are employed with the fluidized bed shown in FIG. 8, the various input requirements are the same as in Example IV. Consequently, the amount and composition of the reactor off-gas are the same as in Example IV. Also the solid product is the same as in the previous examples.

EXAMPLE VI

Figure 9:
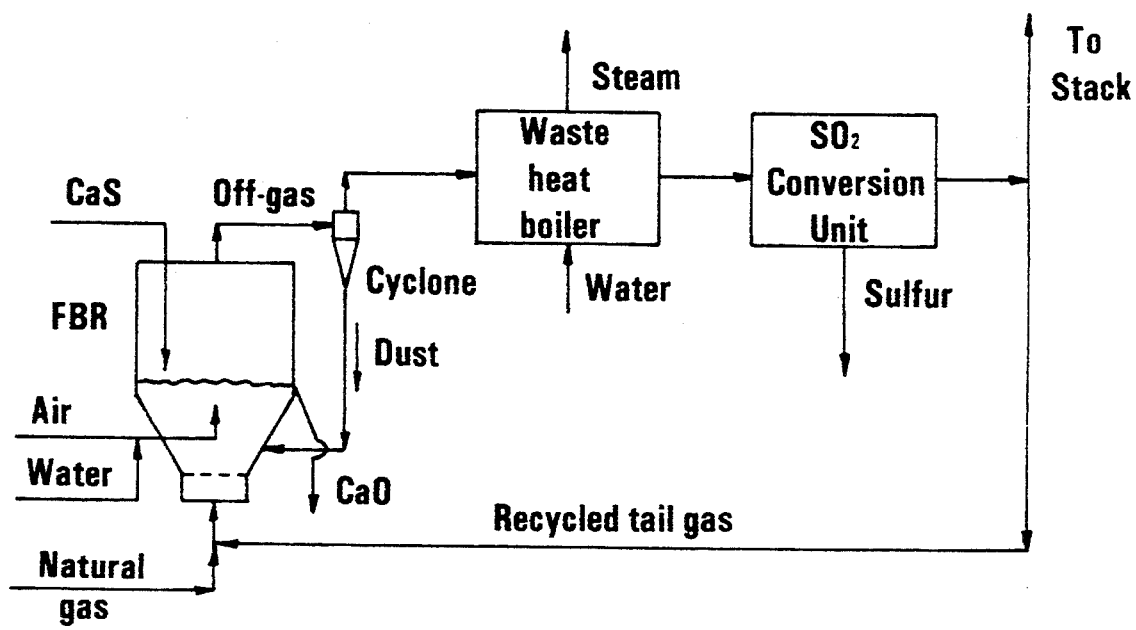
FIG. 9 is a flow sheet for an integrated process which combines a two-zone fluidized bed reactor (FBR) for converting calcium sulfide into calcium oxide and sulfur dioxide with a waste heat boiler for recovering heat from the FBR off-gas and a unit for converting sulfur dioxide in the FBR off-gas into elemental sulfur. A portion of the remaining tail gas is recycled to dilute the natural gas supplied to the FBR.

Utilization of a concentrated reducing agent such as natural gas with a large concentration of methane and possibly other hydrocarbons in the lower zone of the two-zone fluidized bed process exemplified by FIG. 8 requires dilution of the reducing agent with an inert gas such as nitrogen or carbon dioxide. Otherwise calcium sulfate formed in the oxidizing zone will be reduced to calcium sulfide instead of calcium oxide. A possible source of inert gas is the tail gas from an integrated process exemplified by FIG. 9 in which the sulfur dioxide produced from calcium sulfide is converted subsequently to elemental sulfur by a reduction process. After the sulfur is condensed, the remaining gas will be largely nitrogen mixed with a small amount of carbon dioxide. Some of this gas can be recycled and used to dilute the concentrated reducing agent.

To illustrate the application of this invention, natural gas consisting of 90 mole % methane and 10 mole % nitrogen is mixed with recycled gas consisting of 96.8 mole % nitrogen and 3.2 mole % carbon dioxide in such proportions as to provide a reducing gas with the following composition: 10.0 mole % methane 2.8 mole % carbon dioxide and 87.2 mole % nitrogen. The reducing gas is supplied to the lower zone of the two-zone fluidized bed reactor represented by FIG. 8, and air and cooling water are supplied to the upper zone. Simultaneous solution of the material and energy balances for an ideal case shows that the conversion of each mole of calcium sulfide to calcium oxide requires 2.50 moles of reducing gas, 9.52 moles of air, and 3.17 moles of cooling water. The conversion of each mole of calcium sulfide results in the following quantities being present in the reactor off-gas:

|        | moles | mole % |
|--------|-------|--------|
| $SO_2$ | 1.00  | 6.8    |
| $CO_2$ | 0.32  | 2.2    |
| $H_2O$ | 3.67  | 25.0   |
| $N_2$  | 9.73  | 66.0   |
|        | 14.72 | 100.0  |

These results indicate that the off-gas contains 6.8 mole % sulfur dioxide which is equivalent to 9.0 mole % on a dry basis. Consequently, the results are similar to those shown in the previous examples.

EXAMPLE VII

Figure 10:
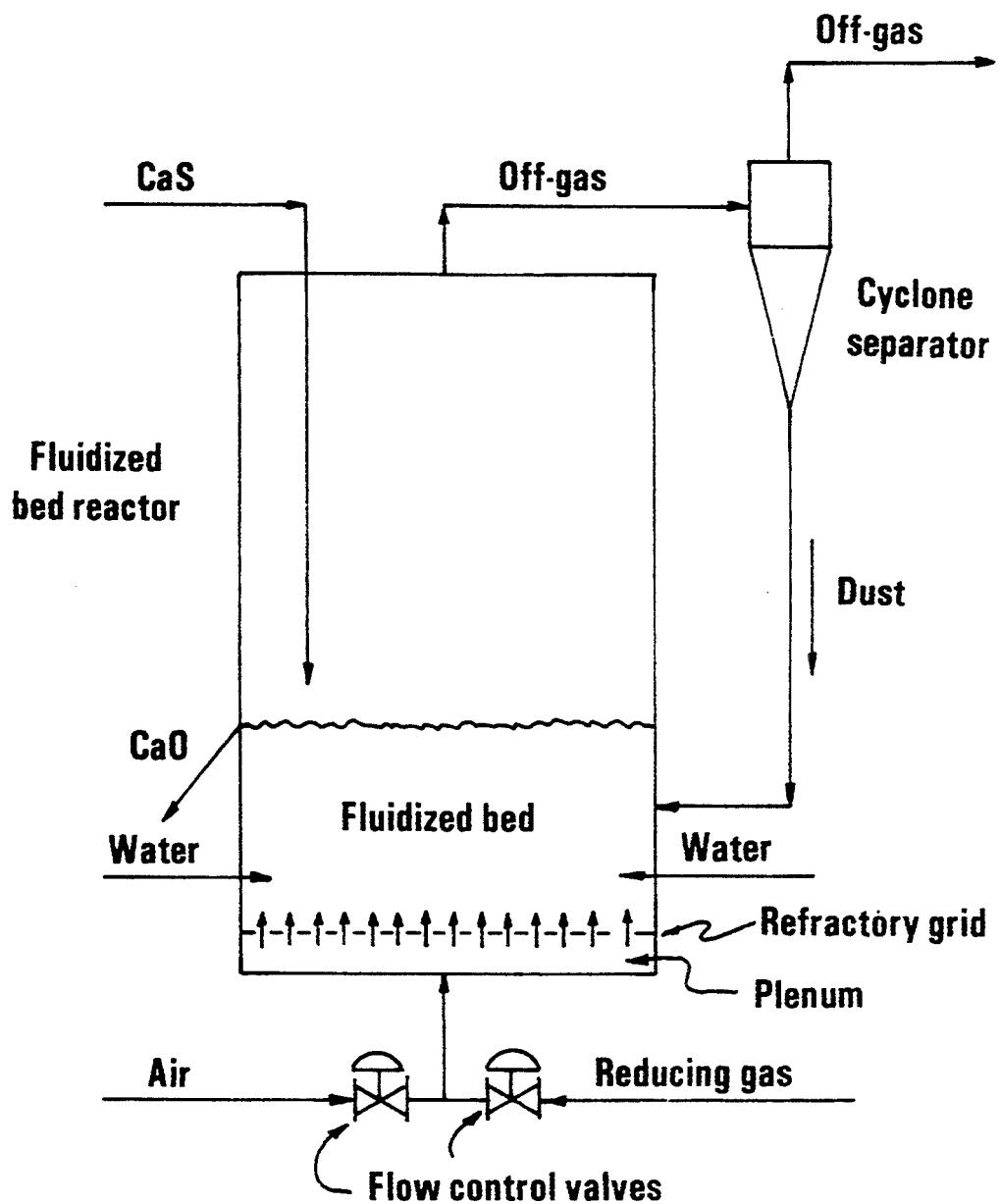
FIG. 10 is a cross-sectional elevational view of fluidized bed reactor equipped with means for continuously cycling the gas supplied to the reactor so that the gas phase present in the reactor varies between oxidizing and reducing states in a periodic manner.

An alternative method of applying the fluidized bed process of this invention is to vary the gas composition of the entire bed in a periodic manner. This is accomplished by varying the composition of the gas supplied through the gas distributor in the bottom of the fluidized bed. The gas composition is varied in a cyclic manner by introducing air during one part of the cycle and a reducing gas during another part of the cycle. Since all of the gaseous reactants are introduced through the bottom distributor plate, the design of the fluidized bed reactor is simpler than for the preceding examples. The cycle time is controlled automatically by a timing device or clock which periodically supplies a signal to open or close valves in the pipelines that supply air and a reducing gas to the fluidized bed reactor as shown in FIG. 10. Either electrically or pneumatically operated control valves can be used. Typically, the cycle time will fall within the range of 1 to 10 min. Generally, the reducing phase of the cycle will be shorter than the oxidizing phase since the process requires less reducing gas than oxidizing gas. Cooling water is also introduced during the oxidizing phase to control the temperature of the fluidized bed. The water can be fed through tuyéres located in the sides of the reactor or through separate nozzles attached to the gas distributor plate at the bottom of the reactor. To maintain a relatively constant superficial gas velocity throughout any given cycle, the volumetric flow rate of air and steam generated by vaporizing cooling water during the oxidizing phase of the cycle will be set equal to the volumetric flow rate of reducing gas during the reducing phase of the cycle. Other features of the fluidized bed reactor will be similar to those described in the previous examples.

When a producer gas having the composition indicated in Example IV is utilized for this process, the overall requirements for producer gas, air, and cooling water are the same as noted in Examples IV and V. In other words, 2.60 moles producer gas, 9.52 moles air, and 4.17 moles cooling water are required for the conversion of each mole of calcium sulfide to calcium oxide. To maintain a constant superficial gas velocity throughout any given cycle, producer gas is introduced during 16% of the cycle and air and cooling water during 84% of the cycle. In this way the oxidizing and reducing agents are also kept in the proportions required for oxidation (reaction 2) and reduction (reactions 3 and 6). While the fluidized bed temperature will fluctuate during each cycle because the oxidation phase is exothermic and the reduction phase is endothermic, an average bed temperature of approximately 1025° C. can be maintained. The composition of the reactor off-gas will also vary during each cycle since most of the sulfur dioxide will appear in the off-gas during the reducing phase. However, the composition of the off-gas averaged over several cycles will be the same as the composition noted in Examples IV and V. The quicklime will be similar in all respects to that produced in the previous examples.

EXAMPLE VIII

The cyclic process of Example VII can be used with a more concentrated reducing gas such as the natural gas described in Example III provided the gas is diluted with an inert gas as in Example VI. The overall inputs of natural gas, air, and cooling water will be the same as in Example VI. Although the reactor off-gas composition will vary within any given cycle, the off-gas composition averaged over several cycles will be the same as that noted for the off-gas in Example VI. The quicklime will be similar in all respects to that produced in the previous examples.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

APPENDIX

[1] Clean Coal Technology Demonstration Program (Program Update 1991), DOE/FE-0247P, February 1992, U.S. Department of Energy, Assistant Secretary for Fossil Energy, Washington, D.C. 20585.

[2] J. Abbasian, A. Rehmat, and D. D. Banerjee, "Sulfation of Partially Sulfided Calcium-Based Sorbents," *Ind. Eng. Chem. Res.*, 30, 1990–1994 (1991) .

[3] D. C. Lynch and J. F. Elliott, "Analysis of the Oxidation Reactions of CaS," *Metallurgical Transactions B*, 11B, 415–425 (1980).

[4] R. J. Torres-Ordonez, J. P. Longwell, and A. F. Sarofim, "Intrinsic Kinetics of CaS(s) Oxidation," *Energy & Fuels*, 3, 506–515 (1989).

[5] D. C. Lynch and J. F. Elliott, "Kinetics of the Oxidation of CaS," *Metallurgical Transactions B*, 9B, 691–704 (1978).

[6] C. E. Morris, T. D. Wheelock, and L. L. Smith, "Processing Waste Gypsum in a Two-Zone Fluidized Bed Reactor," in: *New Developments in Fluidization and Fluid-Particle Systems*, Wen-ching Yang (ed.), American Institute of Chemical Engineers, New York, 1987, pp. 94–104.

[7] T. D. Wheelock and T. Riel, "Cyclic Operation of a Fluidized Bed Reactor for Decomposing Calcium Sulfate," *Chemical Engineering Communications*, 109, 155–166 (1991).

[8] T. D. Wheelock, "Simultaneous Reductive and Oxidative Decomposition of Calcium Sulfate in the Same Fluidized Bed," U.S. Pat. No. 4,102,989, Jul. 25, 1978.

[9] T. D. Wheelock, "Cyclical Reductive and Oxidative Decomposition of Calcium Sulfate in Two-stage Fluidized Bed Reactor," Australian Patent No. 618307.

I claim:

1. A process of oxidizing calcium sulfide, comprising the steps of: alternately exposing calcium sulfide to oxidizing conditions and reducing conditions in a temperature range of about 900° C. to about 1200° C. and removing excess heat of reaction above that required to maintain a reaction mixture in the temperature range; wherein the oxidizing conditions and reducing conditions are provided in a fluidized bed reactor by varying the composition of the gas supplied to the reactor in a periodic manner so that the gas throughout the reactor is alternately oxidizing and reducing; and wherein the reducing gas is diluted with recycled tail gas remaining after the fluidized bed reactor off-gas has been treated to remove sulfur dioxide.

2. A process of oxidizing calcium sulfide, comprising the steps of: alternately exposing calcium sulfide to oxidizing conditions and reducing conditions in a temperature range of about 900° C. to about 1200° C. and removing excess heat of reaction above that required to maintain a reaction mixture in the temperature range; wherein the oxidizing conditions and reducing conditions are provided in a fluidized bed reactor by varying the composition of the gas supplied to the reactor in a periodic manner so that the gas throughout the reactor is alternately oxidizing and reducing; and wherein water is introduced into the fluidized bed during the oxidizing phase of each cycle to absorb heat and control the bed temperature.

3. A process of oxidizing calcium sulfide, comprising the steps of: alternately exposing calcium sulfide to oxidizing conditions and reducing conditions in a temperature range of about 900° C. to about 1200° C. and removing excess heat of reaction above that required to maintain a reaction mixture in the temperature range; wherein the oxidizing conditions and reducing conditions are provided in a fluidized bed reactor having a fluidized bed comprising an oxidizing zone in one part and a reducing zone in another part; wherein a reducing zone is provided in the lower part of the fluidized bed by introducing a reducing gas mixture containing from 1 to 50% reducing gas in the reducing zone, and an oxidizing zone is provided in the upper part of the fluidized bed by introducing an oxidizing gas mixture containing from 10 to 90% oxygen in the oxidizing zone; and wherein the reducing gas is diluted with recycled tail gas remaining after the fluidized bed reactor off-gas has been treated to remove sulfur dioxide.

4. A process of oxidizing calcium sulfide, comprising the steps of: alternately exposing calcium sulfide to oxidizing conditions and reducing conditions in a temperature range of about 900° C. to about 1200° C. and removing excess heat of reaction above that required to maintain a reaction mixture in the temperature range; wherein the oxidizing conditions and reducing conditions are provided in a fluidized bed reactor having a fluidized bed comprising an oxidizing zone in one, part and a reducing zone in another part; wherein a reducing zone is provided in the upper part of the fluidized bed by introducing a reducing gas mixture containing from 1 to 50% reducing gas in the reducing zone, and an oxidizing zone is provided in the lower part of the fluidized bed by introducing an oxidizing gas mixture containing from 10 to 90% oxygen in the oxidizing zone; and wherein the reducing gas is diluted with recycled tail gas remaining after the fluidized bed reactor off-gas has been treated to remove sulfur dioxide.

* * * * *

UNITED STATES PATENT AND TRADEMARK OFFICE
CERTIFICATE OF CORRECTION

PATENT NO. : 5,433,939

DATED : July 18, 1995

INVENTOR(S) : Thomas D. Wheelock

It is certified that error appears in the above-indentified patent and that said Letters Patent is hereby corrected as shown below: Title page, under item [56], col. 2, At the cover page in Other Publications in the second reference, after Ind. insert --Eng.--.

At the cover page in Other Publications in the seventh reference, after the word Sulfate, insert --by T.D. Wheelock and T. Riel,--.

At the cover page in Other Publications after the seventh reference, delete all other references.

At column 2, line 16, delete "oxide" and insert --sulfide--.

At column 2, between equation (1) and line 51, insert the following equation: $--CaS + 2\ O_2 = CaSO_4 \qquad (2)--$.

At column 3, line 25, delete "wetter" and insert --water--.

At column 3, between equation (9) and line 53, insert equation: $--CaSO_4 + CH_4 = CaS + CO_2 + 2\ H_2O \qquad (10)--$.

At column 3, line 60, delete "of-calcium" and insert --of calcium--

At column 7, between line 62 and line 66, delete "$CaS + O_2 = CaSO_4 \qquad (1)$" and insert $--CaS + 2\ O_2 = CaSO_4 \qquad (2)-$ At column 8, between line 30 and line 34, delete "(2)" and insert --(3)--.

At column 10, line 51, after the word methods, delete ",".

At column 11, line 8, after 1025° C. insert --,--.

At column 12, line 28, delete "slides" and insert --sides--.

UNITED STATES PATENT AND TRADEMARK OFFICE
CERTIFICATE OF CORRECTION

PATENT NO. : 5,433,939

DATED : July 18, 1995

INVENTOR(S) : Thomas D. Wheelock

It is certified that error appears in the above-indentified patent and that said Letters Patent is hereby corrected as shown below:

At column 13, line 6, after the word methane insert --,--.

At column 16, line 28, after the word one, delete ",".

Signed and Sealed this

Twelfth Day of March, 1996

*Attest:*

BRUCE LEHMAN

*Attesting Officer*    Commissioner of Patents and Trademarks